Patented Mar. 9, 1926.

1,576,080

UNITED STATES PATENT OFFICE.

ADOLF BECK, OF GRIESHEIM-ON-THE-MAIN, GERMANY, ASSIGNOR TO THE FIRM: CHEMISCHE FABRIK GRIESHEIM-ELEKTRON, OF GRIESHEIM-ON-THE-MAIN, GERMANY.

METHOD OF RECOVERING LIGHT METALS FROM SCRAP AND THE LIKE.

No Drawing.   Application filed April 11, 1924.   Serial No. 705,936.

*To all whom it may concern:*

Be it known that I, ADOLF BECK, a citizen of Germany, residing at Griesheim-on-the-Main, Germany, have invented certain new and useful Improvements in Methods of Recovering Light Metals from Scrap and the like, of which the following is a specification.

My invention refers to a method of recovering light metals from scrap produced in the working of such metals in foundry work and the like. It relates more particularly to improvements in the process described in A. Beielstein's copending application for patent of the United States filed August 24, 1921, Ser. No. 494,842 for a process for recovering light metals from scrap, which comprises stirring the molten scrap metal at an elevated temperature with small amounts of magnesium chloride approximately corresponding to the amount of impurities present.

In practising this process, I have found that it sometimes presents a certain difficulty to accurately compute the quantity of impurities present. In trying to avoid adding too little magnesium chloride, this substance is frequently added in excess and in such a case, as the absorbing capacity for magnesium chloride of the slag formed in the melting operation is rather limited, residues of magnesium chloride will remain in the melt and will form the cause of the well known troubles.

I have now ascertained that this can be avoided in a particularly simple and effective manner by replacing the pure magnesium chloride or carnallite hitherto used by a mixture of this salt with a substance or substances incapable of forming with magnesium chloride low melting eutectics, these substances acting on the molten magnesium chloride in a certain way like thickening media. Oxygen compounds (such as magnesia) or fluorine compounds of magnesium, calcium, aluminium and other metals belonging to the same group will be suited for use in accordance with the present invention and it is to these substances that I refer in the appended claims by the expression "substance adapted to act as a thickening medium."

The quantities of the substances to be added can vary within wide limits and the addition can be made to the magnesium chloride before adding this latter to the metal, or the substance may be added after part or the whole of the metal has molten down. I may for instance start the operation with magnesium chloride either in pure state or with a small percentage of an additional substance admixed to it and the operation can thus be continued with a mixture having a higher percentage of the additional substance. Preferably, the mixtures of magnesium chloride and additional substances are molten down before use.

The process as such is carried out as described in Letters Patent of the United States No. 1,524,470. granted to A. Beielstein, and in the examples hereinafter given, and in connection therewith I have found it advantageous to place near the end of the melting operation some of the mixture onto the surface of the molten metal. Contrary to what one would expect in view of the higher specific weight of the salt mixture, this latter will not sink in the melt, but will form a more or less coherent crust supernatant the molten metal and quantitively remaining in the crucible as the metal is poured. This crust need not cover the entire surface of the melt.

*Example 1.*

300 kg. wastes from the magnesium foundry (runners, risers and the like) containing 3–8% of non-metallic impurities are melted in a crucible, into which have been introduced about 5 kg. $MgCl_2$ which contain about 10% MgO. After the contents of the crucible is completely molten, a further 5–8 kg. of a salt mixture consisting of 50% $MgCl_2$, 25% MgO and 25% $CaF_2$ are admixed to it under stirring. A further 3–5 kg. of this salt mixture are placed onto the surface of the metal. The contents of the crucible is then further heated to about 200° above the melting point of the metal and, in a number of cases, where the removal of certain impurities renders it necessary, a still higher temperature can be employed. The metal is now allowed to cool down without being disturbed by stirring, until the desired casting temperature is reached which is determined by the shapes to be cast in each individual case. The purified metal is then cast in the moulds, well known means being employed for retaining the supernatant slag. In the crucible there remains the slag which covered the surface of the metal and which had collected at the bottom during the melting, together with the impurities. A yield of 95–98% metal is obtained.

*Example 2.*

100 kg. of a mixture of aluminium turnings, sheet metal waste and the like containing about 1–3% impurities of a non-metallic character are molten and mixed by stirring with 2 kg. of a mixture of 70% $MgCl_2$ and 30% $MgO$. After the temperature has been raised further, another kilogram of the same mixture is placed onto the surface of the melt. The metal is now superheated 100° or more and is then allowed to cool down to the casting temperature desired, whereupon the metal is poured out while the slag is retained as mentioned in Example 1. A yield of 96–99% is obtained. The slag can be used once more in the same manner.

*Example 3.*

Into a stock of molten salt mixture consisting of 55% $MgCl_2$, 20% carnallite and 25% $MgO$ so much of a strongly burnt alloy rich in magnesium and containing about 45–50% oxid and nitrate is introduced in the form of chips, that the melt, on being stirred, is still fluid, although rather viscous. Onto the melt there is further placed a small quantity of the salt mixture which need not, however, cover the entire surface, and the whole is then heated without stirring to 830–900°, that is 200–270° above the melting point of the metal, whereafter the melt is allowed to cool down to casting temperature. The yield of pure metal calculated on the percentage of metal in the material employed, amounts to about 80–90%.

By operating in accordance with my novel method, even if an excess of magnesium chloride has been added, the purity of the metal will not be affected any more.

My novel method greatly simplifies the way of proceeding hitherto adopted, inasmuch as the necessity hitherto existing of carefully predetermining the quantity of impurities is obviated, being replaced by a raw estimate. This is rendered possible by the fact that magnesium chloride to which thickening media have been added will exert a compensating influence within wide limits, acting in a certain sense like a buffer which renders the quantity of magnesium chloride employed immaterial as far as the final product is concerned, so that this quantity can be chosen according to purely economical considerations.

Obviously, although in the foregoing description I have described the invention as applied to scrap, it may be used with equal advantage in the treatment and refining of metals containing impurities resulting from any other sources, and even technically pure metals.

I wish it to be understood that I do not desire to be limited to the exact substances, quantities and sequences of operation above described, for obvious modifications will occur to a person skilled in the art.

I claim:—

1. The process for recovering light metals, such as magnesium and aluminium or their alloys from scrap and other impure metallic mixtures, which comprises melting the metal to be treated, adding magnesium chloride and a substance adapted to act as a thickening medium on magnesium chloride, stirring the mixture and separating the molten metal from the foreign substances.

2. The process for recovering light metals, such as magnesium and aluminium or their alloys from scrap and other impure metallic mixtures, which comprises melting the metal to be treated, adding carnallite and a substance adapted to act as a thickening medium on magnesium chloride, stirring the mixture and separating the molten metal from the foreign substances.

3. The process for recovering light metals, such as magnesium and aluminium or their alloys from scrap and other impure metallic mixtures, which comprises melting the metal to be treated, adding magnesium chloride and an oxid capable of acting as a thickening medium on magnesium chloride, stirring the mixture and separating the molten metal from the foreign substances.

4. The process for recovering the light metals, such as magnesium and aluminium or their alloys from scrap and other impure metallic mixtures, which comprises melting the metal to be treated, adding magnesium chloride and magnesia, stirring the mixture and separating the molten metal from the foreign substances.

5. The process for recovering light metals, such as magnesium and aluminium or their alloys from scrap and other impure metallic mixtures, which comprises melting the metal to be treated, adding a mixture of magnesium chloride and a substance adapted to act as a thickening medium on magnesium chloride, placing an additional amount of the mixture of magnesium chloride and such substance onto the surface of the melt, stirring the mixture and separating the molten metal from the foreign substances.

6. The process for recovering light metals, such as magnesium and aluminium or their alloys from scrap and other impure metallic mixtures, which comprises melting the metal to be treated, adding first pure magnesium chloride, thereafter a mixture of magnesium chloride and a substance adapted to act as a thickening medium on magnesium chloride, stirring the mixture and separating the molten metal from the foreign substances.

7. The process for recovering light metals, such as magnesium and aluminium or their alloys from scrap and other impure metallic mixtures, which comprises melting the metal to be treated, adding magnesium chloride and a substance adapted to act as a thickening medium on magnesium chloride, adding thereafter a mixture of the same constituents, but having a greater proportion of such substance, stirring the mixture and separating the molten metal from the foreign substances.

8. The process for recovering light metals, such as magnesium and aluminium or their alloys from scrap and other impure metallic mixtures, which comprises melting the metal to be treated, adding first pure carnallite, thereafter a mixture of carnallite and a substance adapted to act as a thickening medium on magnesium chloride, stirring the mixture and separating the molten metal from the foreign substances.

9. The process for recovering light metals, such as magnesium and aluminium or their alloys from scrap and other impure metallic mixtures, which comprises melting the metal to be treated, adding magnesium chloride, carnallite and a substance adapted to act as a thickening medium on magnesium chloride, adding thereafter a mixture of the same constituents, but having a greater proportion of such substance, stirring the mixture and separating the molten metal from the foreign substances.

In testimony whereof I affix my signature.

ADOLF BECK.